United States Patent
Deakin et al.

(10) Patent No.: US 11,005,933 B2
(45) Date of Patent: May 11, 2021

(54) PROVIDING QUEUEING IN A LOG STREAMING MESSAGING SYSTEM

(71) Applicant: INTERNATIONAL BUSINESS MACHINES CORPORATION, Armonk, NY (US)

(72) Inventors: Oliver M. Deakin, Hursley (GB); Rajini Sivaram, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 15/072,555

(22) Filed: Mar. 17, 2016

(65) Prior Publication Data

US 2017/0272516 A1     Sep. 21, 2017

(51) Int. Cl.
*H04L 29/08* (2006.01)
*H04L 12/863* (2013.01)

(52) U.S. Cl.
CPC ........ *H04L 67/1095* (2013.01); *H04L 47/622* (2013.01)

(58) Field of Classification Search
CPC ... H04L 67/1095; H04L 47/622; H04L 29/08; H04L 67/422; G06F 15/167
See application file for complete search history.

(56) References Cited

U.S. PATENT DOCUMENTS

| | | | |
|---|---|---|---|
| 7,945,631 B2 | 5/2011 | Chkodrov et al. | |
| 7,945,819 B2 | 5/2011 | Chkodrov et al. | |
| 7,996,849 B2 | 8/2011 | Garrard et al. | |
| 8,627,333 B2* | 1/2014 | Chen | G06F 9/546 719/312 |
| 2005/0125558 A1* | 6/2005 | Holden | G06Q 10/107 709/242 |
| 2006/0271784 A1* | 11/2006 | Bolosky | H04L 51/12 713/170 |
| 2009/0043845 A1* | 2/2009 | Garza | G06Q 10/10 709/204 |

(Continued)

FOREIGN PATENT DOCUMENTS

GB     2516852 A     2/2015

OTHER PUBLICATIONS

Apache Kafka, Kafka 0.90 Documentation, Mar. 13, 2016, Apache Kafka. (Year: 2016).*

(Continued)

*Primary Examiner* — Dhairya A Patel
*Assistant Examiner* — Eui H Kim
(74) *Attorney, Agent, or Firm* — Alexander G. Jochym, Esq.; Wayne F. Reinke, Esq.; Heslin Rothenberg Farley & Mesiti P.C.

(57) ABSTRACT

Providing queuing in a log streaming system. A state of each of a set of queues of messages is maintained by sending messages to a state topic in the log streaming system. Responsive to a client writing a message to one of the queues, writing the message to a message topic for the queue in the log streaming system. Responsive to the client reading from one of the queues, reading a message from the message topic for the queue and storing property types relating to the availability of the message in the state topic for the queue by sending messages to the state topic referencing the message in the message topic.

19 Claims, 9 Drawing Sheets

(56) References Cited

U.S. PATENT DOCUMENTS

| | | | | |
|---|---|---|---|---|
| 2013/0036427 A1* | 2/2013 | Chen | ............... | G06F 9/546 |
| | | | | 719/312 |
| 2013/0060834 A1* | 3/2013 | Paramasivam | ......... | H04L 12/66 |
| | | | | 709/202 |
| 2014/0047002 A1* | 2/2014 | Plant | ............... | H04L 29/06047 |
| | | | | 709/203 |
| 2014/0076965 A1* | 3/2014 | Becorest | ............ | G06Q 20/342 |
| | | | | 235/380 |
| 2015/0127769 A1* | 5/2015 | Word | ............... | H04L 47/622 |
| | | | | 709/217 |
| 2016/0357778 A1* | 12/2016 | MacKenzie | ......... | G06F 16/178 |
| 2017/0214762 A1* | 7/2017 | Swain | ............... | H04L 51/26 |
| 2017/0242887 A1* | 8/2017 | Zhao | ............... | G06F 9/5083 |

OTHER PUBLICATIONS

Kreps, Jay et al., "Kafka: A Distributed Messaging System for Log Processing," Jun. 2011, pp. 1-7.

* cited by examiner

PROVIDING QUEUEING IN A LOG STREAMING MESSAGING SYSTEM

BACKGROUND

One or more aspects of the present invention relate to log streaming messaging systems, and more specifically, to providing queuing in a log streaming messaging system.

Log streaming messaging systems, such as Apache Kafka (Apache and Kafka are trademarks of Apache Software Foundation) and Amazon Kinesis (Amazon and Kinesis are trademarks of Amazon.com, Inc.), offer a very lightweight, high-throughput system for data transferal and storage.

Features of log streaming messaging systems include topics in the form of streaming log files written sequentially, which may be partitioned and distributed across a cluster. Each message in a log has a unique identifier, called an offset and messages can be read from any location in the log by specifying the offset to read. Messages may also contain a key; when specified, the message key and payload essentially become a key-value pair. Multiple messages may be written to a topic with the same key, any of which can be read back by jumping to the offset of that message. The latest message may be considered the current value for that key. Messages in topics have a lifespan after which they are deleted. This lifespan is fixed for the whole topic, so a topic represents a rolling window of historical messages.

Apache Kafka additionally has the concept of "log compaction". When enabled, the same deletion of messages older than their lifetime occurs except for those that are the last message for a given key. This means that the current value associated with a key is always kept and the latest state of all keys can be rebuilt by reading the messages back.

Messages in log streaming messaging systems are always available for consumption and the same message can be consumed by multiple clients. These systems lack the ability to behave in a typical queuing way.

SUMMARY

Shortcomings of the prior art are overcome and additional advantages are provided through the provision of a computer-implemented method of providing queuing in a log streaming system. The computer-implemented method includes maintaining state of a queue of messages by sending messages to a state topic for the queue in the log streaming system; based on a client writing a message to the queue, writing the written message to a message topic for the queue in the log streaming system; and based on the client reading from the queue, reading a message from the message topic for the queue and storing property types relating to availability of the read message in the state topic for the queue by sending messages to the state topic referencing the read message in the message topic.

As one example, based on the client writing the message to the queue, writing a visible state message to the state topic for the queue.

In one example, based on a message ordering requirement, partitioning the message topic, wherein ordered messages are written to a single partition.

The property types relating to the availability of the read message include, e.g., a visible property type for a message which is available to be delivered to a client, a locked property type for a message which has been delivered to a client and is currently being processed, and a deleted property type for a message which has been successfully consumed and will not be delivered to another client.

The storing property types relating to the availability of the read message include, for instance, providing the read message to the state topic in the form of one of: a visible state message which is available to be delivered to a consumer, a locked state message which has been delivered to a consumer, or a deleted state message which has been successfully consumed, wherein the locked state message indicates a time at which it is locked enabling it to expire after a given time period.

Further, the property types relating to the availability of the read message may include a compaction key for each visibility state, and a deleted state message may include an empty message for the compaction key in order to remove the state of the read message from the state topic.

In one example, based on taking a selected message off the queue for a consumer, sending a locked state message to the state topic, reading the selected message from the message topic, and passing the selected message data back to the consumer.

Further, as an example, based on a consumer deleting a selected message from the queue, sending an appropriate delete message to the state topic.

As a further example, based on a consumer not deleting a selected message from the queue within a timeout, sending a visible message to the state topic for that message index.

The storing property types relating to the availability of the read message includes, e.g., updating at least one of: an oldest message index before which messages are deleted; a newest message index after which messages are visible; or an indication of visibility of messages between the two indexes.

As examples, based on the state topic not existing for the queue, creating the state topic and maintaining the state topic for the queue, or based on the state topic existing for the queue, reading the state topic from start to finish to get current state of messages in the queue such that a queue broker can operate from its last state.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Log streaming messaging systems stream data in real time with the ability to process thousands of data streams on a per-second basis. The service, designed for real-time apps, allows developers to pull any amount of data, from any number of sources, scaling up or down as needed.

Aspects of the described method and system allow queuing functionality to be implemented on top of a log streaming messaging system without necessarily modifying the underlying implementation.

Queuing behavior for a particular queue has total message ordering preserved. Multiple clients may consume from the queue simultaneously, with only one client consuming and processing any given message before it is deleted from the queue. Each message has a "visibility window" for processing after which it is returned to the queue.

In the described aspects of the method and system, queuing behavior as above can be used interchangeably on topics in a log streaming messaging system. For example, a set of standard publishers may push messages into a topic to be consumed later as a queue by a group of worker clients that apply analytics processing. At the same time messages can be consumed for other purposes (e.g., metrics) from the same topic in the standard non-queuing way at any time.

Figure 1:
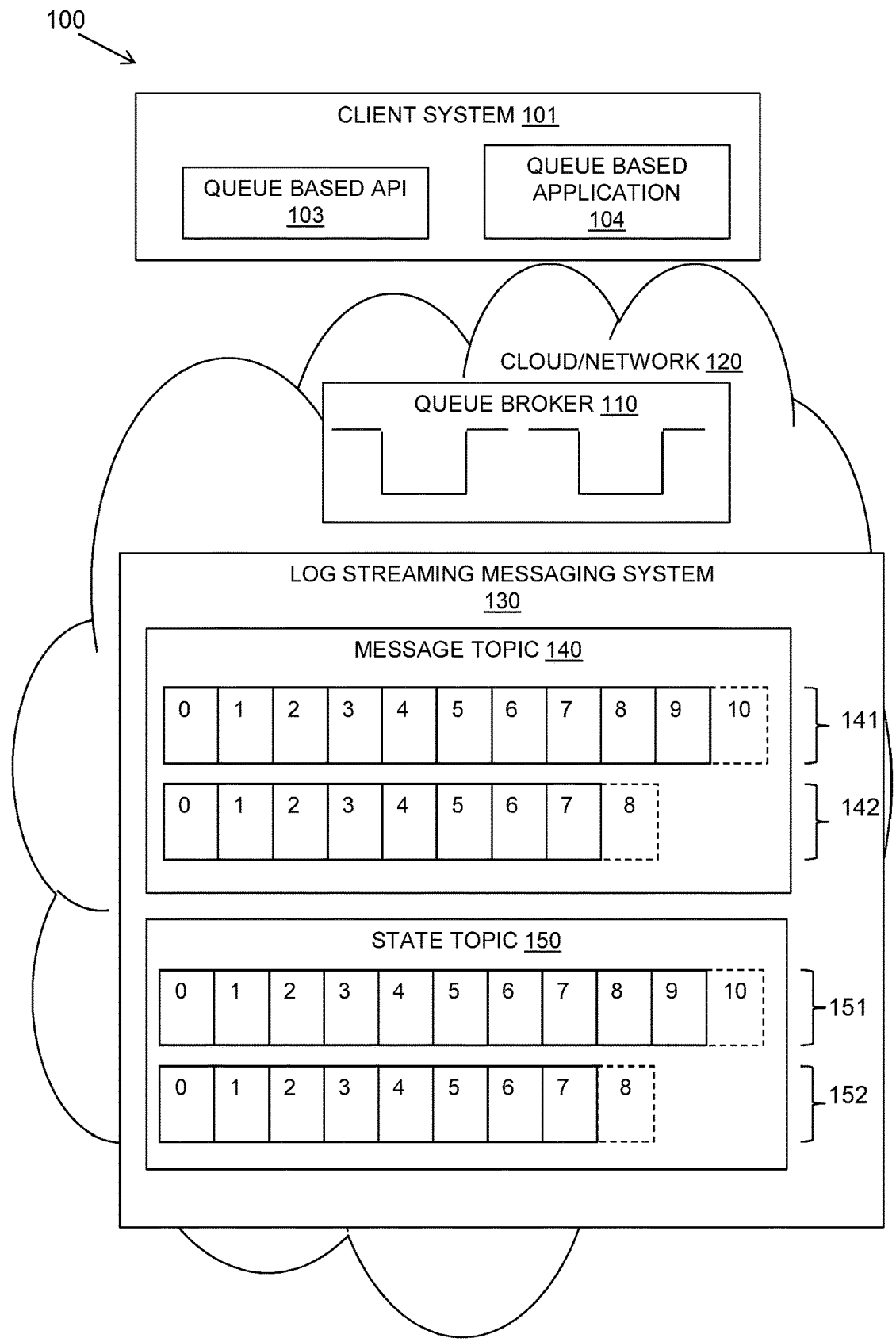
FIG. 1 is a schematic diagram of a system in accordance with one or more aspects of the present invention.

Referring to FIG. 1, a schematic diagram 100 shows an example embodiment of an implementation of the described system. A log streaming messaging system 130 may be provided as a cloud service or a service provided via a network 120. Aspects of the described system provide a queue behavior proxy provided at a queue broker 110. The queue broker 110 may be part of the log streaming messaging system 130, may be provided by an adapter system which adapts a log streaming messaging system 130 to offer different protocols for messaging, or as an independent system for providing the queuing functionality. Multiple queue brokers 110 may be provided for distributed client systems 101 using the log streaming messaging system 130.

The queue broker 110 provides queuing functionality to the log streaming messaging system 130 enabling interoperability between a queue based application programming interface (API) 103 of a client system 101 and the log streaming messaging system 130 enabling a queue based application 104 of a client system 101 to be used.

For client systems with existing infrastructure built on streaming logs, the queuing behavior may be deployed in addition without modifying or taking down their existing log streaming service.

Aspects of the described queuing behavior are transferable between log streaming implementations, so moving from different log streaming implementations, as the underlying service does not change the implementation or behavior of the over-the-top queuing service.

Aspects of the described method and system use the log streaming messaging system itself to store queue state, so has no other dependencies for state management.

A high-level view of the queuing functionality is that a single topic is used to represent a queue, referred to as the message topic, and a second topic is used to publish messages describing the current state of the queue, referred to as the state topic. The state topic uses messages, which describe the current state of the message in the queue in terms of state properties.

To implement the queuing functionality, messages in the queues are stored along with some properties about the status of those messages, which can be reduced to:

Visible—may be delivered to the next consumer.

Locked—has been delivered to a consumer, is currently being processed and is expected to be deleted by that consumer. A visibility timeout starts when the consumer is sent the message and, if it expires before the message is deleted, the message becomes visible again.

Deleted—has been successfully consumed and will never be delivered to another consumer.

In FIG. 1, a message topic 140 and a state topic 150 are schematically shown in the log streaming messaging system 130.

A topic in a log streaming messaging system 130 is a category or feed name to which messages are published. For each topic, a cluster is maintained as a partitioned log. Each partition is an ordered, immutable sequence of messages that is continually appended to. The messages in the partitions are each assigned a sequential identifier number called an offset that uniquely identifies each message within the partition. The cluster retains all messages, whether or not they have been consumed, for a configurable period of time. The partitions in the log enable the log to scale beyond a single server. Each individual partition may fit on a server that hosts it, but a topic may have many partitions.

The message topic 140 may store messages written to a queue at the queue broker. The message may be spread across multiple partitions 141, 142 of the message topic 140.

The state topic 150 is written to when a message is read from the message topic 140 in order to update the state information on the messages in the message topic. The state topic 150 also uses partitions 151, 152 to store the state messages. The state topic 150 may store state messages, in the form of a locked state of a message, a visible state of a message, and a deleted state of a message.

This enables queuing behavior to be built on top of existing log streaming infrastructure without taking that system down or modifying the underlying service. They can use topics in that service interchangeably in a publish/subscribe or queuing manner, and can mix those methods of access on the same topics. This may, in turn, enable queuing APIs, to be implemented on top and then for existing queuing based applications to use the log streaming service.

The queue broker is provided as the entity that handles clients wishing to read/write to topics as a queue and maintains the state of the queues.

The queue broker may maintain the current state in memory either local to the queue broker or accessible to it, as well as publishing state changes to the state topic.

Log streaming services typically have a fixed expiry time for messages. In order not to lose any of the most recent state messages that may be used to rebuild the current state, queue brokers may periodically resend state messages to the state topic.

One embodiment of the described method may use a single state topic to store state for all queues. This may be implemented by adding the message topic name for each queue into its state messages, for example, allowing brokers to filter out state messages for queues they are not interested in.

Figure 2:
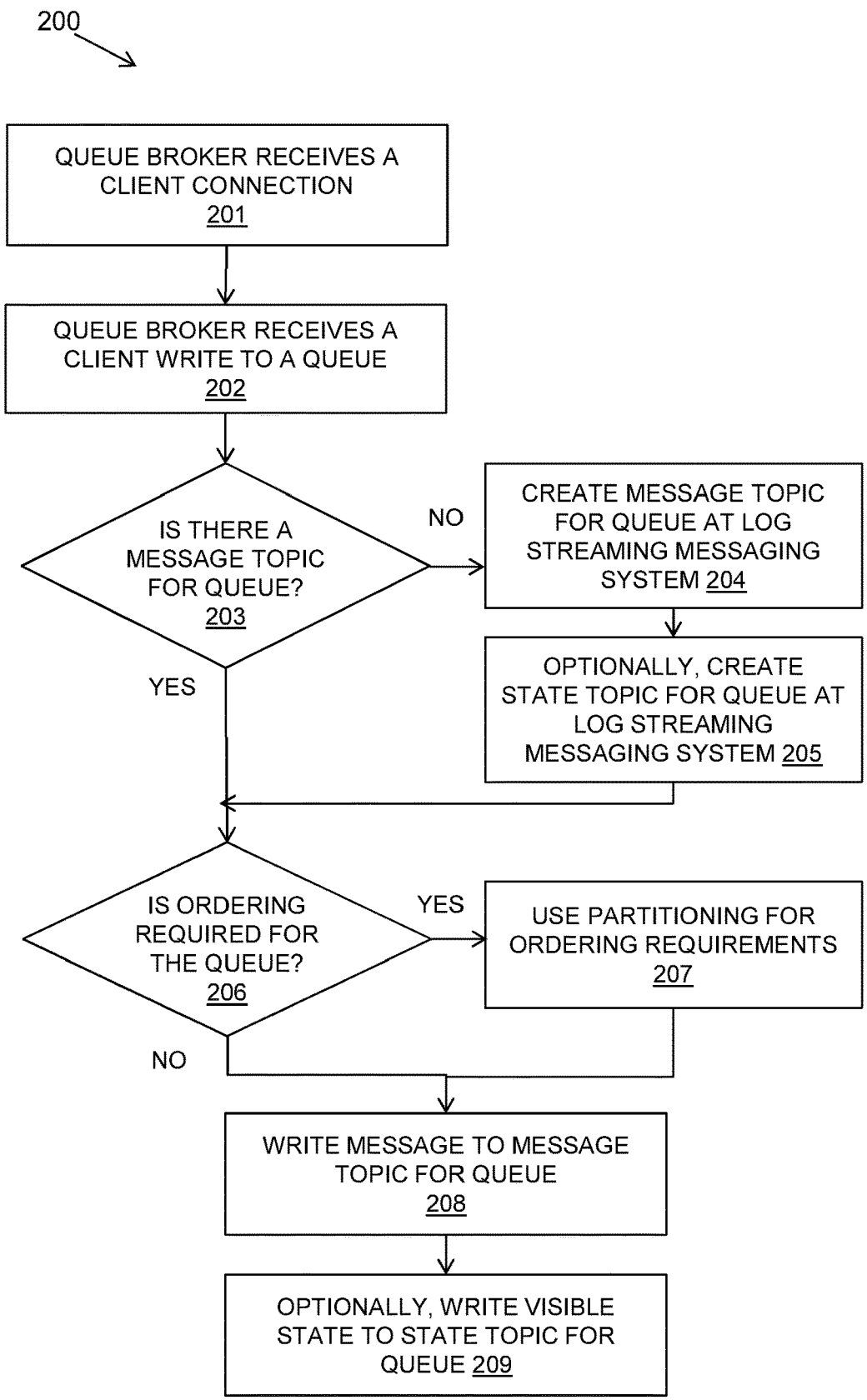
FIG. 2 is a flow diagram of an example embodiment of an aspect of a method in accordance with an aspect of the present invention.

Referring to FIG. 2, a flow diagram 200 shows an example embodiment of an aspect of the described method carried out at a queue broker when receiving a write to a queue from a client.

A client connects to the queue broker to perform queue operations and the queue broker receives 201 the client connection and may have multiple queues available to the client.

The queue broker receives 202 a write to a queue. The queue broker may determine 203 if there is already a message topic for the queue. If there is not an existing message topic for the queue, the message topic is created for the queue at the log streaming messaging system 204. Optionally, in one embodiment described further below, a state topic corresponding to the message topic may be created 205 at the time of creating the message topic for the queue. In an alternative embodiment, this may be created at a later stage when messages are being consumed.

Thereafter, or if there is a message topic for the queue 203, it may then be determined 206 if ordering is required for the queue. If so, consideration may be given to partitioning 207 of the underlying topics as ordering is likely to only be guaranteed for messages within a single partition. For total message ordering across clients, a single partition may be used, although this may affect consumer performance. Alternatively, if only certain message groups needed to be ordered (for example, all messages ordered for any particular publisher, or groupings of messages in a transaction), the queue broker may write only those messages into the same partition. This organization of partitioning is well known.

Thereafter, or if ordering is not required for the queue, message may then be written 208 by the queue broker to the message topic for the queue. In one embodiment, an initial message state may be written 209 to the state topic as "visible". In an alternative embodiment, the state of the message may be written later during consumption of the message.

Figure 3:
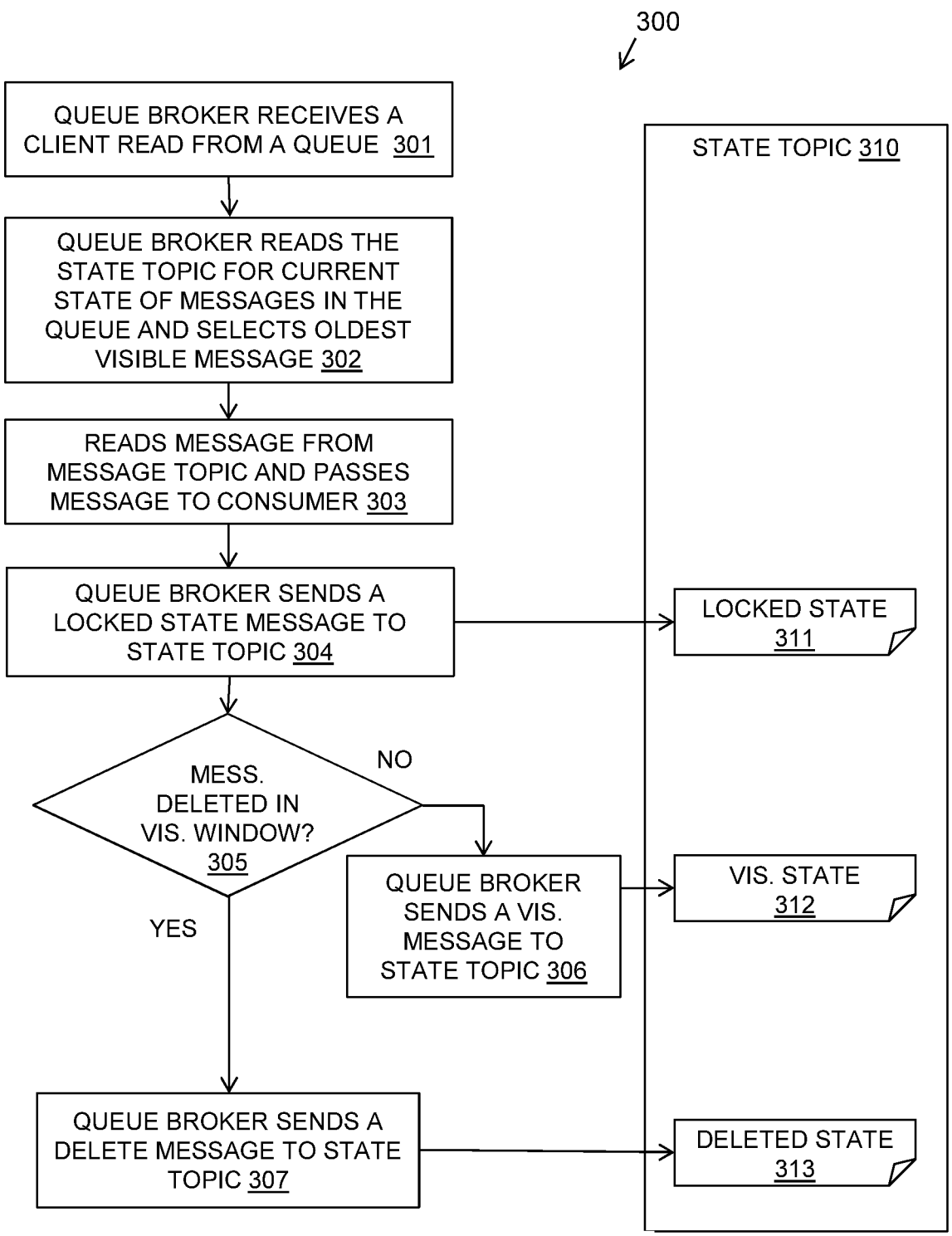
FIG. 3 is a flow diagram of an example embodiment of another aspect of a method in accordance with an aspect of the present invention.

Referring to FIG. 3, one embodiment of updating the state topic for a queue is described. In this embodiment, a state topic is created when a first message is written to a queue. When messages are written to a queue, the state topic is updated with an index for the message with a visible state.

The queue broker may receive 301 a client read request from a queue. The queue broker may read 302 the state topic for the queue for the current state of messages in the queue and may select the oldest visible message.

The queue broker may read 303 the message from the message topic using the message index and pass the message content to the consumer.

The queue broker may send 304 a locked state 311 message to the state topic 310 for the message.

The queue broker may start a timer for a visibility window when the message is consumed by the client for processing and the queue broker may track when this timer completes. It may be determined 305 if a response has been received from the client deleting the message in the visibility widow.

If the message has not been deleted in the time period, the queue broker may send 306 a visible state message 312 to the state topic 310 and the message will again be available to be consumed.

If the message is deleted in the time period, the queue broker may send 307 a delete state message 313 to the state topic.

The following are two worked examples of one embodiment described in FIG. 3.

Example of Message Processing

1) To start, both the message topic (MT) and the state topic (ST) are empty.

MT ||

ST ||

2) A client "producerClient" connects and sends 2 messages at indices M1 to M2. The broker writes each message to MT along with its default initial state of visible (denoted by V) to the ST. The state is sent with a key of the message topic index (i.e., M1 to M2) and a payload of the state. Messages are written left to right in this representation.

MT |M1|M2|

−ST |M1-V|M2-V|

3) A client "consumerClient1" connects to broker1 and requests a message. Broker1 sees from the current state that M1 is visible, so it sends a state message of locked (L) with a timestamp for M1 and then returns the message to consumerClient1.

MT |M1|M2|

ST |M1-V|M2-V|M1-L1234|

4) A client "consumerClient2" connects to broker2 and requests a message. Broker2 sees both the M1-V and M1-L1234 messages in order from the current state, and thus that M1 is locked. It sees that M2 is visible, so it sends a state message of locked (L) with a timestamp for M2 and then returns the message to consumerClient2.

MT |M1|M2|

ST |M1-V|M2-V|M1-L1234|M2-L1235|

5) ConsumerClient1 tells broker1 to delete M1 as it has processed the message. Broker1 sends a state message for M1 with an empty payload to indicate it is deleted. ConsumerClient1 can see that M2 is locked, and there are no further messages in MT to consume.

MT |M1|M2|

ST |M1-V|M2-V|M1-L1234|M2-L1235|M1-|

6) ConsumerClient2 tells broker2 to delete M2 as it has processed the message. Broker2 sends a state message for M2 with an empty payload to indicate it is deleted. Broker2 returns no further messages to consumerClient2, as there are no more messages in MT to consume.

MT |M1|M2|

ST |M1-V|M2-V|M1-L1234|M2-L1235|M1-|M2-|

If the state log were now to be compressed, this would result in the following. As M1 and M2 have no state, it is assumed they are deleted, and thus, there are no visible messages to consume.

MT |M1|M2|

ST ||

Example of Visibility Window Expiry

1) Starting at state (5) above.

MT |M1|M2|

ST |M1-V|M2-V|M1-L1234|M2-L1235|M1-|

2) ConsumerClient2 fails to delete M2 within the visibility window, so broker2 sends a fresh visibility state message for M2. Any deletion messages coming from consumerClient2 after this time are responded to with an error, indicating that consumerClient2 is to request the message again to process it.

MT |M1|M2|
ST |M1-V|M2-V|M1-L1234|M2-L1235|M1-|M2-V|

3) ProducerClient sends two more messages M3 and M4 to broker1. The broker writes each message to MT along with its default initial state of visible to the ST

MT |M1|M2|M3|M4|
ST |M1-V|M2-V|M1-L1234|M2-L1235|M1-|M2-V|M3-V|M4-V|

4) ConsumerClient1 requests a message from broker1. Broker1 can now see that M2 is the earliest index message with visible state, so it sends a lock message with a timestamp to ST and returns the message content to consumerClient1.

MT |M1|M2|M3|M4|
ST |M1-V|M2-V|M1-L1234|M2-L1235|M1-|M2-V|M3-V|M4-V|M2-L1236|

5) ConsumerClient2 requests a message from broker2. Broker2 can see that M2 is no longer visible but M3 is, so it sends a lock message with a timestamp to ST and returns the message content to consumerClient2.

MT |M1|M2|M3|M4|
ST |M1-V|M2-V|M1-L1234|M2-L1235|M1-|M2-V|M3-V|M4-V|M2-L1236|M3-L1237|

6) ConsumerClient2 tells broker2 to delete M3 as it has processed the message. Broker2 sends a state message for M3 with an empty payload to indicate it is deleted.

MT |M1|M2|M3|M4|
ST |M1-V|M2-V|M1-L1234|M2-L1235|M1-|M2-V|M3-V|M4-V|M2-L1236|M3-L1237|M3-|

7) At this point, a compaction occurs of ST. The state that is left still fully describes the total state of all messages in MT.

MT |M1|M2|M3|M4|
ST |M4-V|M2-L1236|

As M1 has an index before the earliest message with a "live" state, which is M2, it is assumed deleted. M3 is after M2 but has no state, so again it is assumed deleted. M2 and M4 have explicit state described in ST.

From here the system continues as above, compacting as required.

Figure 4A:
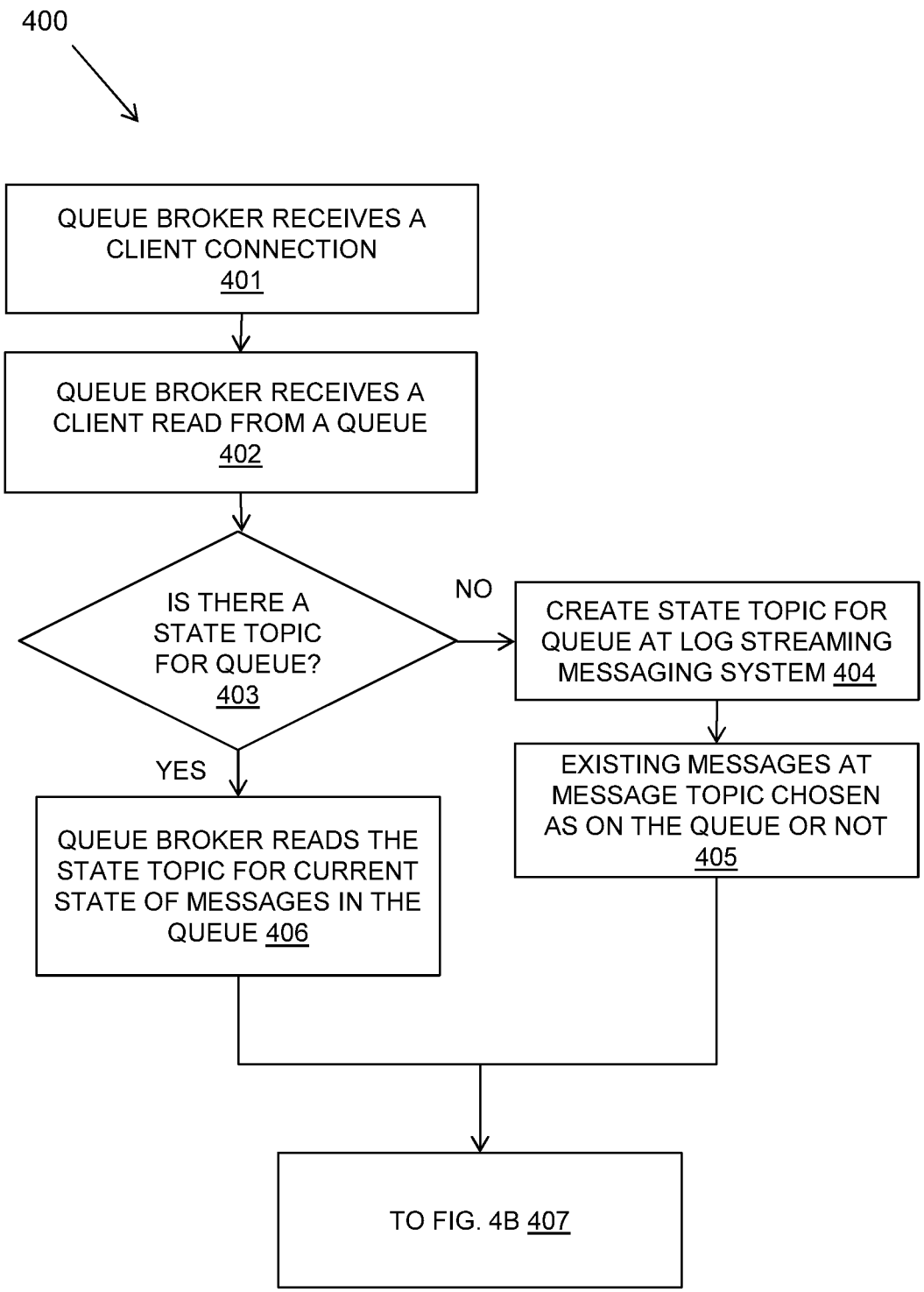
FIGS. 4A and 4B are flow diagrams of another example embodiment of the other aspect of a method in accordance with an aspect of the present invention.
Figure 4B:
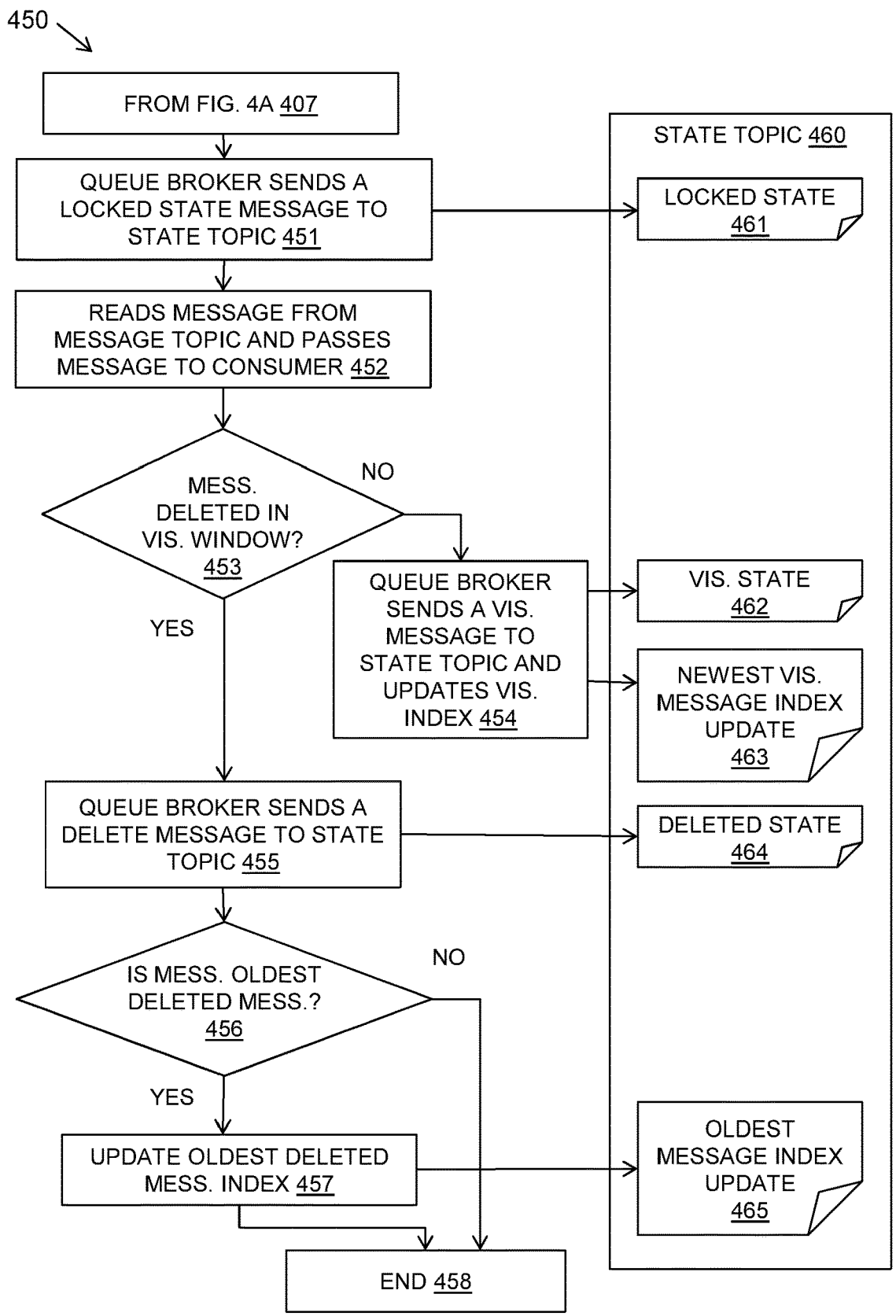

Referring to FIGS. 4A and 4B, flow diagrams 400, 450 show another embodiment of updating the state topic for a queue. Aspects of the described method are carried out at a queue broker when receiving a read to a queue from a client. FIG. 4A shows an initial method for establishing a state topic at the time of reading a message, and FIG. 4B shows a method of updating the state topic.

In FIG. 4A, the queue broker may receive 401 a client connection and a client read 402 from a queue hosted by the queue broker.

When the client reads from a queue, there are two flows depending on whether the state topic already exists or not. Therefore, it is determined 403 if the state topic exists for the queue.

If a state topic does not exist, the state topic may be created 404 by the queue broker and then maintained. At this point, existing messages stored for this topic on the message topic may either be chosen 405 to be on the queue or not, depending on the desired behavior. The method may then proceed 407 to FIG. 4B.

If the state topic exists 403, the queue broker may read 406 the state topic from start to finish to get the current state of all messages in the queue. This allows a queue broker to die, restart and resume from its last state. The method may then proceed 407 to FIG. 4B.

In FIG. 4B, the method may continue from box 407 of FIG. 4A. When reading messages there are three types of property that may be stored in the state topic. The state topic 460 is shown in FIG. 4B to illustrate the updated information.

The three types of property are:
1. An oldest message index before which all messages are deleted messages.
2. A newest message index after which all messages are visible messages.
3. The visibility status of messages between these two indexes, i.e. visible, locked or deleted. Both locked and deleted messages indicate the index of the message. Locked messages may also indicate the time at which they were locked so their visibility window can be expired appropriately.

The status topic therefore provides a status record of the messages in the message topic in the range between deleted and visible messages. The messages to the state topic may just reference a message in the message topic without its content. The form of the indexes is implementation specific; however, generally the indexes are a numeric offset into the partition that may or may not be directly linked to the location of the message in the partition. They may be monotonically increasing integers.

When a queue broker takes a message off the queue for a consumer, it may send 451 a locked state message 461 to the state topic 460 and then may read 452 the message from the message topic, passing the message data back to the consumer.

It may then be determined 453 by the queue broker, if the consumer deletes the message within a visibility window. If the consumer does not delete the message in the required time, the queue broker may send 454 a visible state message 462 to the state topic 460 for that message and also may update the newest visible message index 463, if required.

However, if the consumer does delete the message from the queue within the visibility window, the queue broker may send 455 an appropriate delete state message 464 to the state topic 460.

It may be determined 456, if the deleted message is the oldest deleted message. If not, processing ends 458. If so, then the oldest deleted message index may also be updated 457 by sending a message to the state topic 460 to update the oldest message index 465.

The oldest message index before which all messages are deleted and the newest message index after which all messages are visible may, in general, have indexes close together so the amount of intermediary state to be stored at any time should be small.

In log streaming implementations that have message compaction functionality, topic compaction may be used to preserve the most recent state messages of each type, removing the need to resend those messages.

In existing log streaming systems, messages can be sent with an associated "key", which creates a key-value pair of key to message payload. The standard known compaction algorithm keeps only the latest value (i.e., message payload) for a given key. Historical values are deleted. This compacts the partition down to only contain a single message per key. Another property of this compaction is that if an empty message is sent for a particular key, it wipes out the state—i.e. when compaction occurs, if the last message for a key is empty, then no state is preserved for that key at all. It effectively deletes the state for that key.

In another embodiment of the described method of maintaining a status topic, the method may use a key for each of the three properties: a key of allDeletedBeforeIndex, a key of all VisibleAfterIndex, and a single key of visibilityStates that contains the state of all messages between the allDeletedBeforeIndex and allVisibleAfterIndex. This is a simple implementation in which updating the visibility of a message involves sending an update message for all messages in the visibilityStates message.

In an alternative embodiment, the method may use allDeletedBeforeIndex and all VisibleAfterIndex keyed messages, but instead of a visibilityStates message, the following scheme may be employed.

When a message's visibility changes to locked or back to visible, a message may be sent with the state of that message (and any additional metadata, such as timestamp of locking) to the state topic. The key may be set to the index of the message to which the state belongs.

When a message is deleted, an empty message may be sent to the state topic, again with the index of the message being deleted as the key. This removes the state for this message index, so state for old messages does not build up.

The allDeletedBeforeIndex and all VisibleAfterIndex messages are sent depending on the changing state.

When the state messages are read back by the queue broker, the latest values of allDeletedBeforeIndex, all VisibleAfterIndex and indexes in between the values of these two messages may be used to rebuild the state. Any indexes that have an empty message as their latest state or do not have a state message at all are in a deleted state, as they followed the scheme above.

Figure 5:
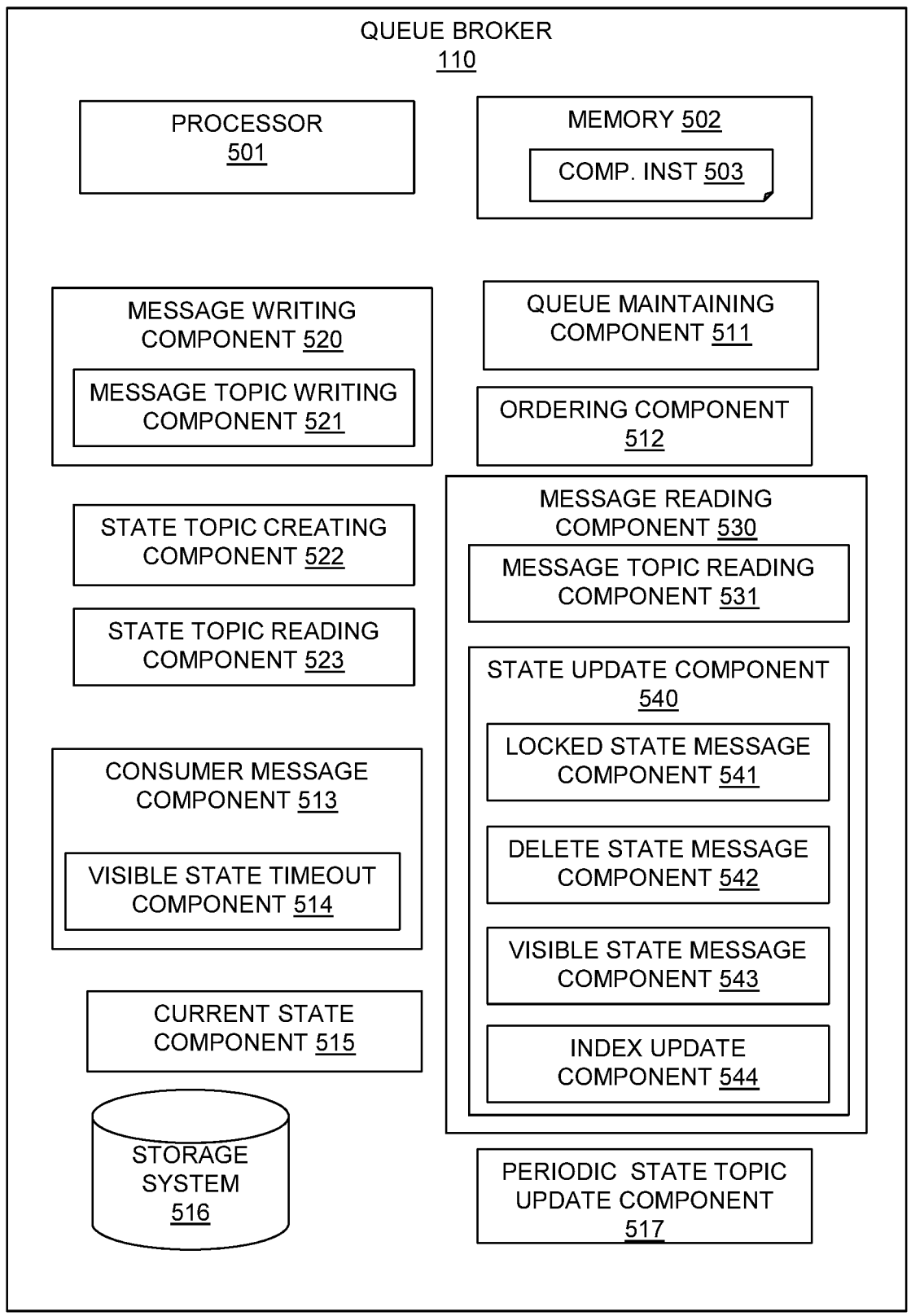
FIG. 5 is a block diagram of an example embodiment of a system in accordance with an aspect of the present invention.

Referring to FIG. 5, an example embodiment of a queue broker 110 is shown providing a queue behavior proxy as described herein. The queue broker 110 may be part of a log streaming messaging system, may be provided by an adapter system which adapts a log streaming messaging system to offer different protocols for messaging, or as an independent system for providing the queuing functionality.

The queue broker 110 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The queue broker 110 may include a queue maintaining component 511 for maintaining a state of each of a set of queues of messages by publishing messages to a state topic in the log streaming system.

The queue broker 110 may include a message writing component 520 including a message topic writing component 521 for, responsive to a client writing a message to one of the queues, writing the message to a message topic for the queue in the log streaming system. The queue broker 110 may include a state topic creating component 522 for, responsive to the state topic not existing for a queue, creating the state topic and maintaining the state topic for the queue. The queue broker 110 may also include a state topic reading component 523 for reading the state topic from start to finish to get the current state of all messages in the queue so that the queue broker can operate from its last state.

The queue broker 110 may include a message reading component 530 including a message topic reading component 531 for, responsive to the client reading from one of the queues, reading a message from the message topic for the queue. The message reading component 530 may include a state update component 540 for storing property types relating to the availability of the message in the state topic for the queue.

The state update component 540 may include an index update component 544, if required, for updating at a state topic an oldest message index before which all messages are deleted and a newest message index after which all messages are visible.

The state updated component 540 may include a locked state message component 541 for sending to the state topic a locked state message for a message which has been delivered to a consumer, a delete state message component 542 for sending to the state topic a deleted state message for a message which has been successfully consumed, and a visible state message component 543 for sending to the state topic a visible state message for a message which is available to be delivered to a consumer.

The queue broker 110 may include a consumer message component 513 for monitoring the consumption of a message by a consumer and a visible state timeout component 514 for timing the processing of a message and expiring a visibility window if no response is received from a consumer within the time frame.

The queue broker 110 may include an ordering component 512 for, responsive to a message ordering requirement, partitioning a message topic, so that the queue broker writes ordered messages to a single partition.

The queue broker 110 may also include a current state component 515 for maintaining the current state of messages at the queue broker, for example in a storage system 516, and a periodic state topic update component 517 for resending state messages to the state topic periodically.

Aspects of the method involve dynamically composing message queuing properties on top of the underlying log streaming. This may be used in an OSGi or platform as a service type scenario.

Figure 6:
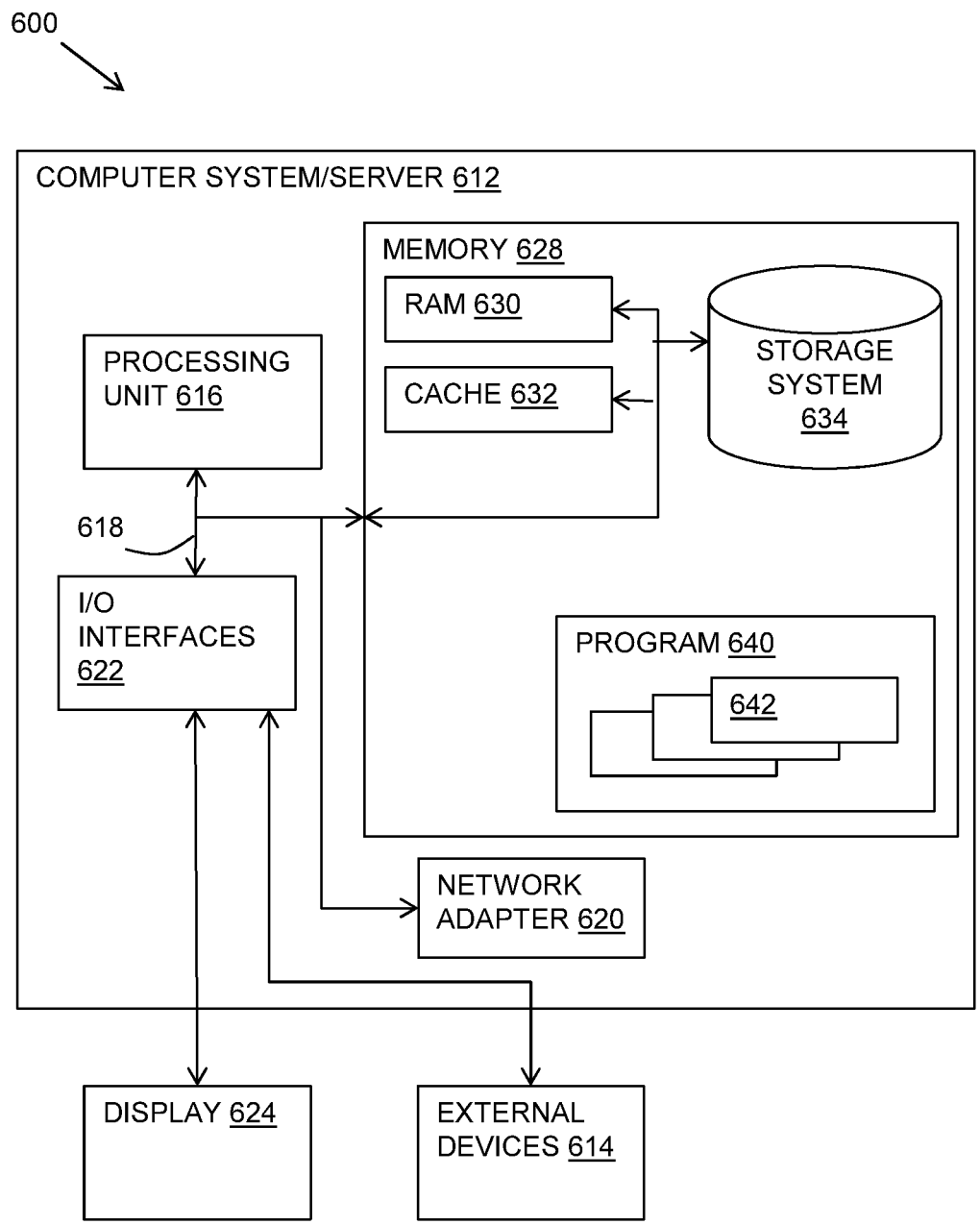
FIG. 6 is a block diagram of an embodiment of a computer system or cloud server in which aspects of the present invention may be implemented.

Referring now to FIG. 6, a schematic of an example of a system 600 in the form of a computer system or server is shown in which the described queue broker 110 may be implemented.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

As described herein, according to one aspect of the present invention, there is provided a computer-implemented method for providing queuing in a log streaming system carried out by a queue broker system, comprising: maintaining a state of each of a set of queues of messages by sending messages to a state topic in the log streaming system, wherein the state topic is for one or more queues; responsive to a client writing a message to one of the queues, writing the message to a message topic for the queue in the log streaming system; and responsive to the client reading from one of the queues, reading a message from the message topic for the queue and storing property types relating to the availability of the message in the state topic for the queue by sending messages to the state topic referencing the message in the message topic.

Responsive to a client writing a message to one of the queues, the method may include writing a visible state message to a state topic for the queue. Alternatively, this may wait until a message is read.

Responsive to a message ordering requirement, the method may include partitioning a message topic, so that the queue broker writes ordered messages to a single partition.

Storing property types relating to the availability of the message may include: a visible property type for a message which is available to be delivered to a client, a locked property type for a message which has been delivered to a client and is currently being processed, and a deleted property type for a message which has been successfully consumed and will not be delivered to another client.

Storing property types relating to the availability of the message may include providing a message to the state topic in the form of one of: a visible state message which is available to be delivered to a consumer, a locked state message which has been delivered to a consumer, or a deleted state message which has been successfully consumed, wherein the locked state message indicates a time at which it is locked enabling it to expire after a given time period.

Storing property types relating to the availability of the message may include a compaction key for each of the visibility states, and a deleted state message may include an empty message for the key in order to remove the state of the message from the state topic.

Responsive to the queue broker taking a message off the queue for a consumer, the method may send a locked state message to the state topic, read the message from the message topic, and pass the message data back to the consumer.

Responsive to the consumer deleting the message from the queue, the method may send by the queue broker, an appropriate delete message to the state topic.

Responsive to the consumer not deleting the message from the queue within a timeout, the method may send by the queue broker, a visible message to the state topic for that message index.

Storing property types relating to the availability of the message may further include updating: an oldest message index before which all messages are deleted; a newest message index after which all messages are visible; and an indication of the visibility of messages between the two indexes. The method may include updating to the oldest deleted message index, if required when sending a deleted state message, and updating the newest visible message index, if required when sending a visible state message.

The oldest message index before which all messages are deleted and the newest message index after which all messages are visible, may use a compaction key for the states in which a single message is kept for a key and historical values for the key are deleted.

Writing the message to the message topic may contain a message payload, and sending messages to the state topic referencing the message in the message topic may not include the message payload.

Responsive to the state topic not existing for a queue, the method may include creating the state topic and maintaining the state topic for the queue. Responsive to the state topic existing for a queue, the method may read the state topic from start to finish to get the current state of all messages in the queue so that the queue broker can operate from its last state.

The method may include maintaining the current state of messages at the queue broker and resending state messages to the state topic periodically.

A single state topic may be used to store state for multiple queues by adding a message topic name for each queue to the state messages.

Software for carrying out the method may be provided as a service in a cloud environment.

According to another aspect of the present invention, there is provided a system for providing queuing in a log streaming system including a queue broker system comprising: a processor and a memory configured to provide computer program instructions to the processor to execute the function of components of the queue broker system; a queue maintaining component for maintaining a state of each of a set of queues of messages by sending messages to a state topic in the log streaming system, wherein the state topic is for one or more queue; a message writing component for, responsive to a client writing a message to one of the queues, writing the message to a message topic for the queue in the log streaming system; and a message reading component for, responsive to the client reading from one of the queues, reading a message from the message topic for the queue and including a state update component for storing property types relating to the availability of the message in the state topic for the queue by sending messages to the state topic referencing the message in the message topic.

The system may include an ordering component for, responsive to a message ordering requirement, partitioning a message topic, so that the queue broker writes ordered messages to a single partition.

The state topic update component may provide a message to the state topic in the form of one of: a visible state message which is available to be delivered to a consumer, a locked state message which has been delivered to a consumer, or a deleted state message which has been successfully consumed.

The state update component for storing property types relating to the availability of the message includes updating: an oldest message index before which all messages are deleted; a newest message index after which all messages are visible; and an indication of the visibility of messages between the two indexes.

The system may include a state topic creating component for, responsive to the state topic not existing for a queue, creating the state topic and maintaining the state topic for the queue.

The system may also include a state topic reading component for, reading the state topic from start to finish to get the current state of all messages in the queue so that the queue broker can operate from its last state.

The system may include a current state component for maintaining the current state of messages at the queue broker and a periodic state topic update component for resending state messages to the state topic periodically.

The system may include a consumer message component monitoring a client consumption of a message including timing a visible state timeout of a message.

According to another aspect of the present invention, there is provided a computer program product for providing queuing in a log streaming system, the computer program product comprising a computer readable storage medium having program instructions embodied therewith, the program instructions executable by a processor to cause the processor to: maintain a state of each of a set of queues of messages by sending messages to a state topic in the log streaming system, wherein the state topic is for one or more queues; responsive to a client writing a message to one of the queues, write the message to a message topic for the queue in the log streaming system; and responsive to the client reading from one of the queues, read a message from the message topic for the queue and storing property types relating to the availability of the message in the state topic for the queue by sending messages to the state topic referencing the message in the message topic.

Described aspects of the invention provide for implementing message queues on top of log streaming messaging systems without requiring modification of the log streaming messaging system.

The use of a second topic for state storage, the reduction of state into minimal components required to represent the queue, and the storage and retrieval of that state in the topic make the queuing functionality flexible and versatile.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
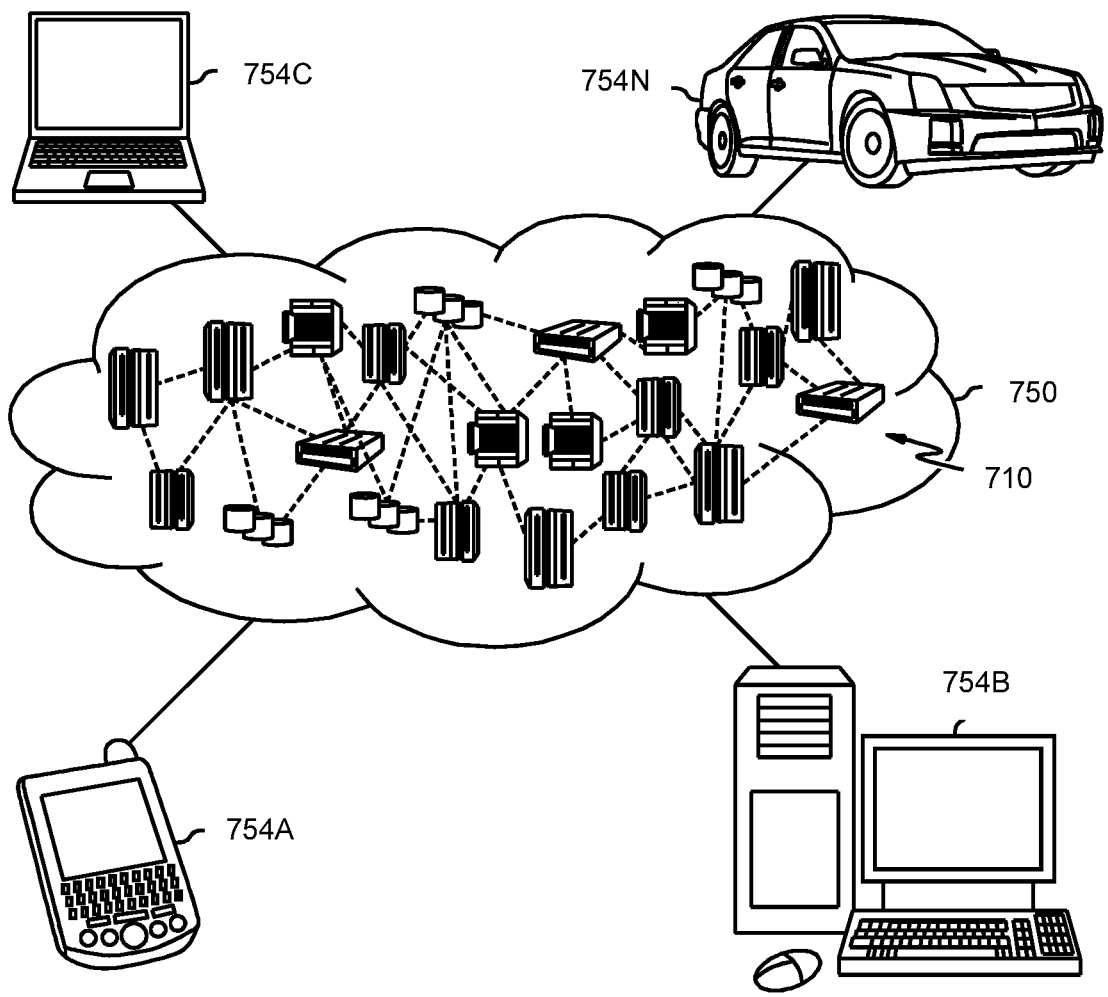
FIG. 7 is a schematic diagram of a cloud computing environment in which aspects of the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
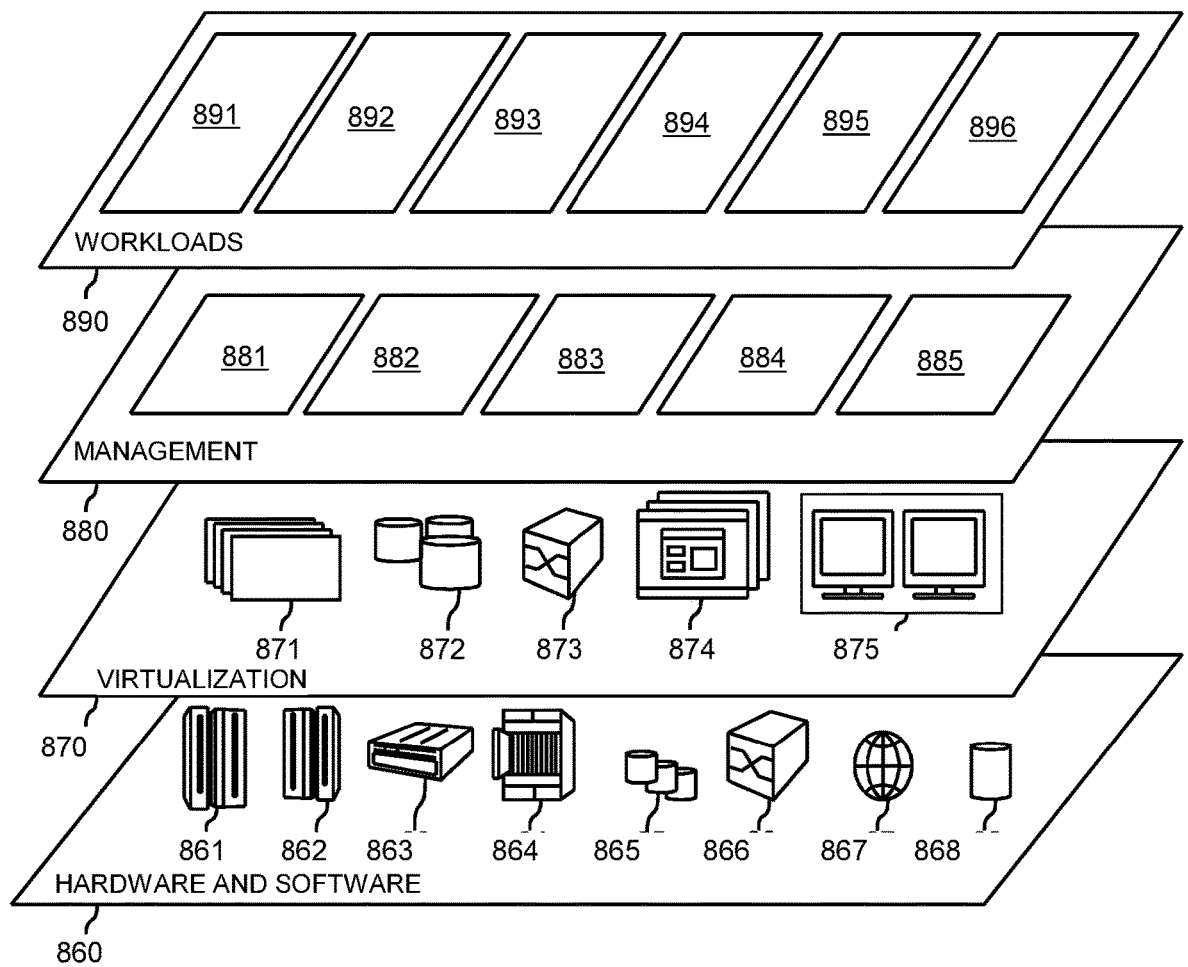
FIG. 8 is a diagram of abstraction model layers of a cloud computing environment in which aspects of the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and message query functionality 896 as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method of providing queuing in a log streaming system, the computer-implemented method comprising:
   maintaining state of a plurality of queues of messages by sending messages to one state topic for the plurality of queues in the log streaming system;
   based on a client writing a message to a queue of the plurality of queues, writing the written message to a message topic for the queue in the log streaming system, the message topic being a topic used to represent the queue, the topic being a category to which messages are published;
   based on the client reading from the queue, reading a message from the message topic for the queue and storing property types relating to availability of the read message in the one state topic for the queue by sending messages to the one state topic referencing the read message in the message topic, wherein the queue has the message topic to store messages written to the queue and the one state topic to store state messages regarding state of the messages of the message topic, wherein the queue has a message topic name that is stored with a corresponding state message in the one state topic;
   wherein the property types relating to the availability of the read message include: a visible property type for a message which is available to be delivered to a client, a locked property type for a message which has been sent and delivered to a client, is currently being processed by the client and is expected to be deleted by the client, and a deleted property type for a message which has been successfully consumed and will not be delivered to another client;
   based on the message having the locked property type, starting a timer for a visibility timeout when the message is sent to the client;
   based on a consumer deleting a selected message from the queue, sending an appropriate delete message to the one state topic;
   based on expiration of the timer before the message is deleted by the client, making the message visible; and
   based on at least one change in state for one or more of the messages, continually appending the one state topic with the at least one change in state.

2. The computer-implemented method as claimed in claim 1, wherein based on the client writing the message to the queue, writing a visible state message to the one state topic.

3. The computer-implemented method as claimed in claim 1, wherein based on a message ordering requirement, partitioning the message topic, wherein ordered messages are written to a single partition.

4. The computer-implemented method as claimed in claim 1, wherein the storing property types relating to the availability of the read message include providing the read message to the one state topic in the form of one of: a visible state message which is available to be delivered to a consumer, a locked state message which has been delivered to a consumer, or a deleted state message which has been successfully consumed, wherein the locked state message indicates a time at which it is locked enabling it to expire after a given time period.

5. The computer-implemented method as claimed in claim 1, wherein the property types relating to the availability of the read message include a compaction key for each visibility state, and a deleted state message includes an empty message for the compaction key in order to remove the state of the read message from the one state topic.

6. The computer-implemented method as claimed in claim 1, wherein the reading a message from the message topic for the queue comprises a queue broker reading the message from the message topic and passing the message to the client, the computer-implemented method further comprising, based on the client receiving the message, sending a locked state message and the message topic name from the queue broker to the one state topic, resulting in the message having the locked property type.

7. The computer-implemented method as claimed in claim 1, further comprising based on a consumer not deleting a selected message from the queue within a timeout, sending a visible message to the one state topic for that message index.

8. The computer-implemented method as claimed in claim 1, wherein the storing property types relating to the availability of the read message includes updating at least one of:
   an oldest message index before which messages are deleted;
   a newest message index after which messages are visible; or
   an indication of visibility of messages between the two indexes.

9. The computer-implemented method as claimed in claim 1, wherein based on the one state topic existing for the queue, reading the one state topic from start to finish to get current state of messages in the queue such that a queue broker can operate from its last state.

10. The computer-implemented method as claimed in claim 1, wherein a message has an initial state of visible.

11. A computer system for providing queuing in a log streaming system, the computer system comprising:
    a memory; and
    a processor in communication with the memory, wherein the computer system is configured to perform a method, said method comprising:
       maintaining state of a plurality of queues of messages by sending messages to a one state topic for the plurality of queues in the log streaming system;
       based on a client writing a message to a queue of the plurality of queues, writing the written message to a message topic for the queue in the log streaming system, the message topic being a topic used to represent the queue, the topic being a category to which messages are published;

based on the client reading from the queue, reading a message from the message topic for the queue and storing property types relating to availability of the read message in the one state topic for the queue by sending messages to the one state topic referencing the read message in the message topic, wherein the queue has the message topic to store messages written to the queue and the one state topic to store state messages regarding state of the messages of the message topic, wherein the queue has a message topic name that is stored with a corresponding state message in the one state topic;

wherein the property types relating to the availability of the read message include: a visible property type for a message which is available to be delivered to a client, a locked property type for a message which has been sent and delivered to a client, is currently being processed by the client and is expected to be deleted by the client, and a deleted property type for a message which has been successfully consumed and will not be delivered to another client;

based on the message having the locked property type, starting a timer for a visibility timeout when the message is sent to the client;

based on a consumer deleting a selected message from the queue, sending an appropriate delete message to the one state topic;

based on expiration of the timer before the message is deleted by the client, making the message visible; and based on at least one change in state for one or more of the messages, continually appending the one state topic with the at least one change in state.

12. The computer system as claimed in claim 11, wherein based on a message ordering requirement, partitioning the message topic, wherein ordered messages are written to a single partition.

13. The computer system as claimed in claim 11, wherein the property types relating to the availability of the read message include a compaction key for each visibility state, and a deleted state message includes an empty message for the compaction key in order to remove the state of the read message from the one state topic.

14. The computer system as claimed in claim 11, wherein a message has an initial state of visible.

15. A computer program product for providing queuing in a log streaming system, the computer program product comprising:

a computer readable storage medium readable by a processing circuit and storing instructions for execution by the processing circuit for performing a method comprising:

maintaining state of a plurality of queues of messages by sending messages to a one state topic for the plurality of queues in the log streaming system;

based on a client writing a message to a queue of the plurality of queues, writing the written message to a message topic for the queue in the log streaming system, the message topic being a topic used to represent the queue, the topic being a category to which messages are published;

based on the client reading from the queue, reading a message from the message topic for the queue and storing property types relating to availability of the read message in the one state topic for the queue by sending messages to the one state topic referencing the read message in the message topic, wherein the queue has the message topic to store messages written to the queue and the one state topic to store state messages regarding state of the messages of the message topic, wherein the queue has a message topic name that is stored with a corresponding state message in the one state topic;

wherein the property types relating to the availability of the read message include: a visible property type for a message which is available to be delivered to a client, a locked property type for a message which has been sent and delivered to a client, is currently being processed by the client and is expected to be deleted by the client, and a deleted property type for a message which has been successfully consumed and will not be delivered to another client;

based on the message having the locked property type, starting a timer for a visibility timeout when the message is sent to the client;

based on a consumer deleting a selected message from the queue, sending an appropriate delete message to the one state topic;

based on expiration of the timer before the message is deleted by the client, making the message visible; and based on at least one change in state for one or more of the messages, continually appending the one state topic with the at least one change in state.

16. The computer program product as claimed in claim 15, wherein based on a message ordering requirement, partitioning the message topic, wherein ordered messages are written to a single partition.

17. The computer program product as claimed in claim 15, wherein the storing property types relating to the availability of the read message include providing a read message to the one state topic in the form of one of: a visible state message which is available to be delivered to a consumer, a locked state message which has been delivered to a consumer, or a deleted state message which has been successfully consumed, wherein the locked state message indicates a time at which it is locked enabling it to expire after a given time period.

18. The computer program product as claimed in claim 15, wherein the property types relating to the availability of the read message include a compaction key for each visibility state, and a deleted state message includes an empty message for the compaction key in order to remove the state of the read message from the one state topic.

19. The computer program product as claimed in claim 15, wherein a message has an initial state of visible.

* * * * *